(12) United States Patent
Egbert

(10) Patent No.: US 6,282,915 B1
(45) Date of Patent: Sep. 4, 2001

(54) EVAPORATIVE COOLER

(75) Inventor: Karl Egbert, Bailey, CO (US)

(73) Assignee: IndireX, Bailey, CO (US)

( * ) Notice: Subject to any disclaimer, the term of this patent is extended or adjusted under 35 U.S.C. 154(b) by 0 days.

(21) Appl. No.: 09/489,776

(22) Filed: Jan. 24, 2000

(51) Int. Cl.$^7$ .......................................... F28D 5/00
(52) U.S. Cl. .................................. 62/314; 62/304; 62/91
(58) Field of Search ............................... 62/304, 314, 91

(56) References Cited

U.S. PATENT DOCUMENTS

| | | |
|---|---|---|
| 3,148,442 | 9/1964 | Gier, Jr. . |
| 4,002,040 | 1/1977 | Munters et al. . |
| 4,582,126 | 4/1986 | Corey . |
| 4,730,462 * | 3/1988 | Rogers .................................. 62/171 |
| 4,781,248 | 11/1988 | Pfeiffer . |
| 4,913,776 | 4/1990 | Finnemore et al. . |
| 5,042,270 * | 8/1991 | Sanchez ................................ 62/314 |
| 5,775,121 * | 7/1998 | Kuma et al. ......................... 62/314 |
| 5,800,595 | 9/1998 | Wright . |
| 5,816,318 | 10/1998 | Carter . |
| 5,927,097 | 7/1999 | Wright . |

FOREIGN PATENT DOCUMENTS

| | | |
|---|---|---|
| 2301222 | 7/1974 | (DE) . |
| 57-74582 A * | 5/1982 | (JP) ........................................ 62/304 |

\* cited by examiner

Primary Examiner—Henry Bennett
Assistant Examiner—Melvin Jones
(74) Attorney, Agent, or Firm—Wall Marjama & Bilinski

(57) ABSTRACT

An evaporative cooler including a cross-flow plate heat exchanger formed by a plurality of stacked, fluted plates. The evaporative cooler may be operated in an indirect evaporative cooling process, or in a combined direct and indirect mode. The heat exchanger operates as a cross between a cross-flow exchanger and a counter-flow exchanger because the primary and secondary air streams are not perpendicular or parallel to one another, but rather, are oriented at an oblique angle. In a preferred embodiment formed by stacked hexagonal plates, the shape of the exchanger lends itself to the application of water on a primary side to achieve two-stage (indirect plus direct) evaporative cooling. In the two-stage operation mode, all six sides of the heat exchanger have water flowing through the corrugated flutes. The heat exchanger provides a single, compact design that utilizes all six sides for air inlet and outlets, providing a higher efficiency exchanger as compared to traditional compact indirect evaporative cross-flow plate heat exchangers.

23 Claims, 5 Drawing Sheets

EVAPORATIVE COOLER

BACKGROUND OF THE INVENTION

1. Field of the Invention

The present invention relates to evaporative coolers, and more particularly pertains to an evaporative cooler utilizing both direct and indirect processes in a single unit.

2. Description of the Prior Art

Evaporative cooling (or swamp cooling) has existed for many centuries. People experience evaporative cooling when they step out of a swimming pool on a breezy day. The use of evaporative cooling for structures is thought to have begun in ancient Egypt with the use of wetted rags hanging in door and window ways. Today the technology has developed to high efficiency media types which have life expectancies of up to 5 years. Traditional swamp coolers utilize aspen wood fiber or synthetic mesh pads sprayed or soaked with water to achieve temperature reduction through evaporative cooling as air is blown across the wetted pads. The high efficiency media pads achieve higher, and more consistent, performance, which results in lower temperatures. The reduction of air temperature is the result of energy transferred from the hot air to the water as it changes from a liquid to a gas upon evaporation. As air is blown over the media, the rate of evaporation is increased dramatically. Since the air to be cooled is in direct contact with the water, this process is called direct or "wet" evaporative cooling. Evaporative coolers are very inexpensive to operate when compared to traditional air conditioning, and use less energy, and are thus more environmentally friendly.

Indirect evaporative cooling systems utilize an air exchanger to separate the evaporating water from the air stream to be cooled. Since the evaporated water is not in contact with the air stream, the air is cooled with no moisture added. This process is known as "dry" evaporative cooling.

Two-stage evaporative cooling systems employ combined indirect (dry) and direct (wet) evaporative cooling processes, resulting in an air temperature which is lower than that achieved by either of the processes independently, while producing air with a moisture content lower than that of traditional direct (wet) evaporative cooling.

Evaporative cooling has many advantages over other air cooling technologies, including: lower energy consumption, avoiding potentially environmentally harmful refrigerants used in mechanical refrigeration, improved indoor air quality through the air washing nature of evaporative cooling, and low operational costs.

The use of evaporative coolers is generally well known, and many patents have issued to various particular devices and systems employing evaporative cooling processes. Examples of such prior art patents include U.S. Pat. Nos. 3,148,442, 4,002,040, 4,582,126, 4,781,248, 4,913,776, 5,800,595, 5,816,318, and 5,927,097. The entire disclosures of each of the foregoing patents are hereby incorporated herein by this reference thereto.

SUMMARY OF THE INVENTION

The present invention provides an evaporative cooler including a cross-flow plate heat exchanger formed by a plurality of stacked, fluted plates. The evaporative cooler according to the present invention may be operated in an indirect evaporative cooling process, or in a combined direct and indirect mode. The heat exchanger operates as a cross between a cross-flow exchanger and a counter-flow exchanger because the primary and secondary air streams are not perpendicular or parallel to one another, but rather, are oriented at an oblique angle. In a preferred embodiment formed by stacked hexagonal plates, the shape of the exchanger lends itself to the application of water on a primary side to achieve two-stage (indirect plus direct) evaporative cooling. In the two-stage operation mode, all six sides of the heat exchanger have water flowing through the corrugated flutes. The inventive heat exchanger provides a single, compact design that utilizes all six sides for air inlet and outlets, providing a higher efficiency exchanger as compared to traditional compact indirect evaporative cross-flow plate heat exchangers.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 1 is an isometric diagrammatic representation of an assembled heat exchanger according to a preferred embodiment of the present invention illustrating the manner of air flows there through.

DETAILED DESCRIPTION OF THE PREFERRED EMBODIMENT(S)

Figure 1:
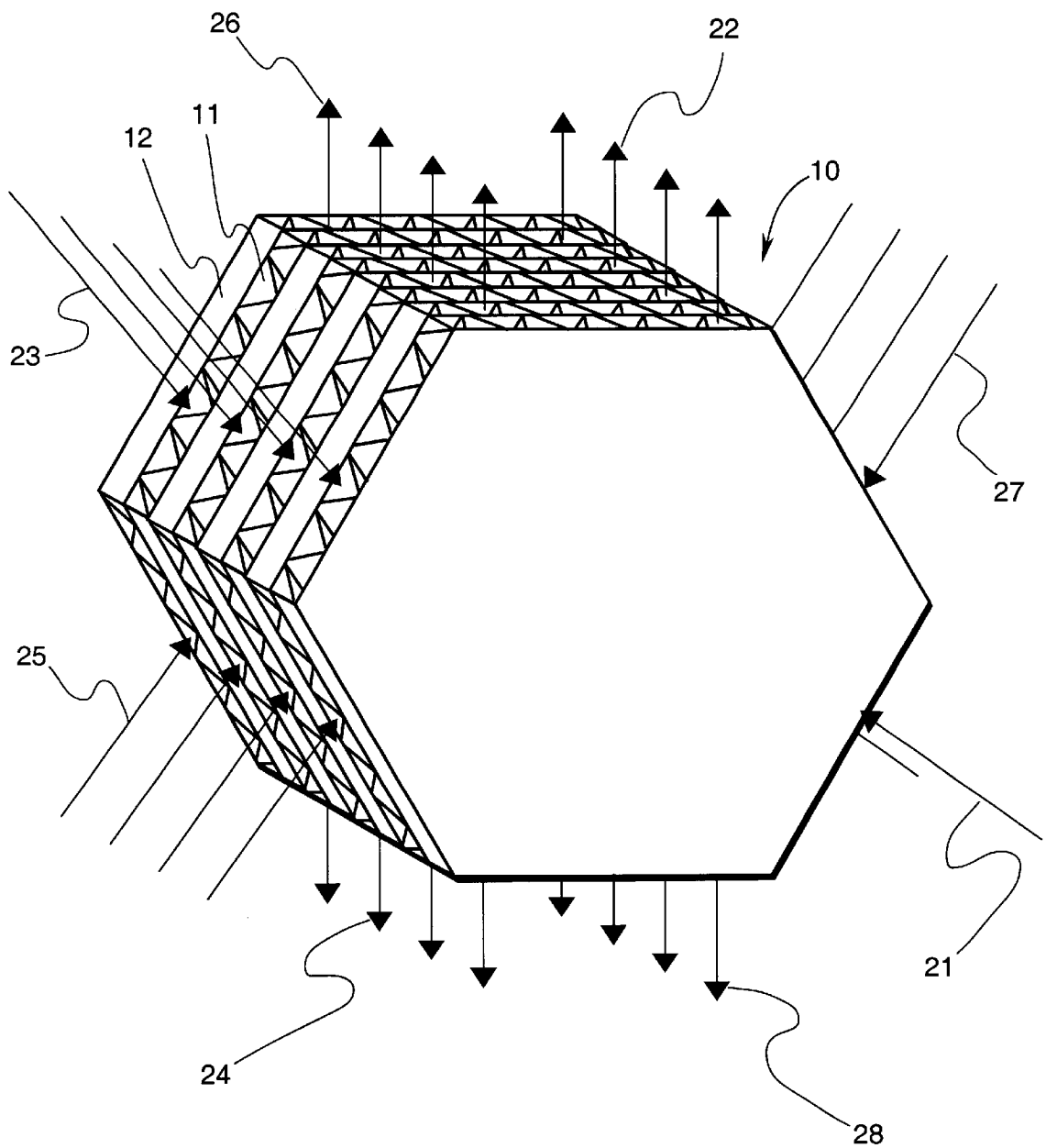

The present invention provides an evaporative cooling system including a heat exchanger that may operate using both indirect and direct evaporative cooling. Before providing a detailed description of the specific constructional features of an evaporative cooling system according to an example of preferred embodiment of the present invention, the following discussion of direct and indirect evaporative cooling is provided.

Direct evaporative cooling gets its name from the direct contact of the air stream to be cooled and the surface of the water to be evaporated. Direct evaporative cooling is also known as adiabatic cooling or saturation since no heat is gained or lost. The air temperature is lowered by the conversion of sensible heat into latent heat. Through this process the moisture content of the air is increased because the conversion causes evaporation of the water into the air stream. The result of direct evaporative cooling is an air stream with cooler air and with an increased moisture content. The temperature to which the air can be lowered is limited to the entering air's wet bulb temperature.

Indirect evaporative cooling utilizes the process of direct evaporative cooling to cool an air stream, known as the secondary air stream, to cool a heat exchange medium which in turn cools a separate air stream known as the primary air stream. Since the medium is cooled independently by the secondary air stream which is then exhausted away from the system, the medium cools the primary air stream without any additional moisture added to the primary air stream. The present invention utilizes a plurality of stacked plastic plates as the heat exchange medium. The plates include air flutes which separate the secondary and primary air flows.

The result of the indirect process is a primary air stream with a lower air temperature with no increase in moisture content. Therefore the primary air stream has a reduced dry bulb temperature, as well as a reduced wet bulb temperature.

The heat exchanger of the present invention has the unique ability to operate selectively utilizing both direct and indirect processes in a single compact unit. The exchanger uses the process of indirect evaporative cooling to cool the primary air stream, thus lowering both the dry bulb and wet bulb temperatures. The exchanger also has the ability to add a second stage of cooling by adding water for evaporation on the primary air stream of the exchanger. This direct evaporative cooling stage added to the precooled primary air stream allows for additional cooling of the primary air to accomplish even lower air temperatures. This process of two-stage evaporative cooling (indirect plus direct) can supply air temperatures at below the ambient wet-bulb temperature with a lower moisture content than that of direct evaporative cooling only.

The following design example illustrates the dramatically improved results obtained by an application of an evaporative cooler employing a heat exchanger constructed and operated according to the present invention. In a typical application in Phoenix, Ariz. where the industry standard design condition is 108° F. (dry bulb) and 48 grains of moisture (70° F. wet bulb or 13% relative humidity), the Ambient Air Condition is 108° F. with 48 grains of moisture (70° F. wb). A conventional Direct Evaporative Cooling process, assuming 80% efficient cooling, results in a Supply Air Temperature of 78° F. and 97 grains of moisture (70° F. wb). A Two-Stage (Indirect plus Direct Evaporative Cooling) process according to the present invention results in a Supply Air Temperature of 67° F. and 76 grains of moisture (62.5° F. wb), for a substantially lower air temperature having a substantially lower moisture content compared with a conventional evaporative cooling system. Note that with indirect plus direct cooling the supply air temperature may now be lowered past the ambient wet bulb temperature.

With the foregoing discussion of the applicable principles of direct and indirect cooling in mind, and referring now to the drawings, wherein like reference numerals designate corresponding structure throughout the views, and referring in particular to FIGS. 1–5, an example construction of an evaporative cooling system according to a preferred embodiment of the present invention will now be described.

Figure 5A:
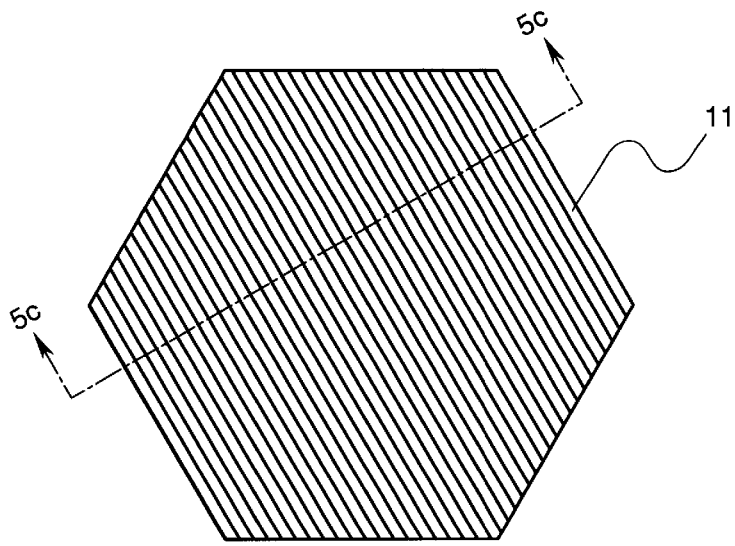
FIGS. 5A and 5B are diagrammatic representations illustrating the oblique angular orientation of air flow flutes on two adjacent individual heat exchanger plates of the assembled heat exchanger according to the present invention.
Figure 5B:
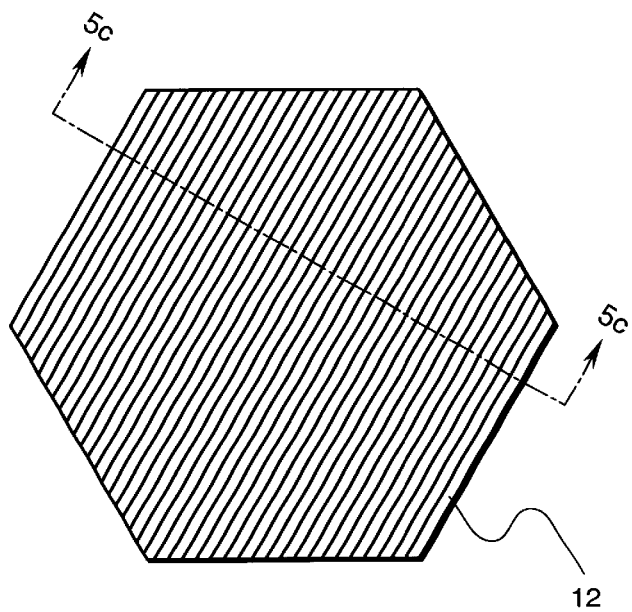
Figure 5C:
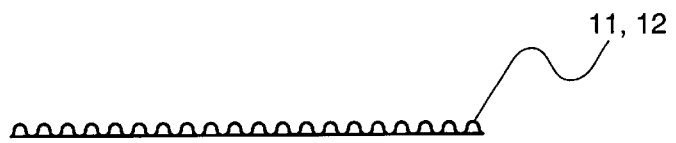
FIG. 5C is a transverse cross-sectional view of an individual heat exchanger plate, taken along line 5C—5C of FIGS. 5A and 5B, illustrating the sinusoidal configuration of the air flow flutes thereof.

As shown in FIG. 1, an evaporative cooler according to an example preferred embodiment of the present invention includes a generally hexagonal-shaped heat exchanger 10 formed by a plurality of pairs of stacked individual adjacent hexagonal plates 11 and 12. FIGS. 5A and 5B illustrate two of the adjacent individual plates 11 and 12, with diagonal lines representing the oblique relative angular orientation of individual corrugated air flutes of each plate, as shown in the cross-sectional view of FIG. 5C. Plate 11 is preferably cut with the air flute orientation at a 30° counter clockwise angle from vertical. Plate 12 is preferably cut with the air flute orientation at a 30° clockwise angle from vertical. Both plates are cut in a hexagonal shape with all six sides having equal lengths and all interior angles at 120°. As may be best appreciated from FIG. 5C, the transverse cross-sectional view of the plates, each plate is made from a flat sheet of a plastic material that is bonded or otherwise secured to a separate sheet of sinusoidal corrugated plastic sheet, forming a plurality of spaced, adjacent, parallel air flow flutes of an open-ended tubular nature on each of the plates 11 and 12.

Figure 4:
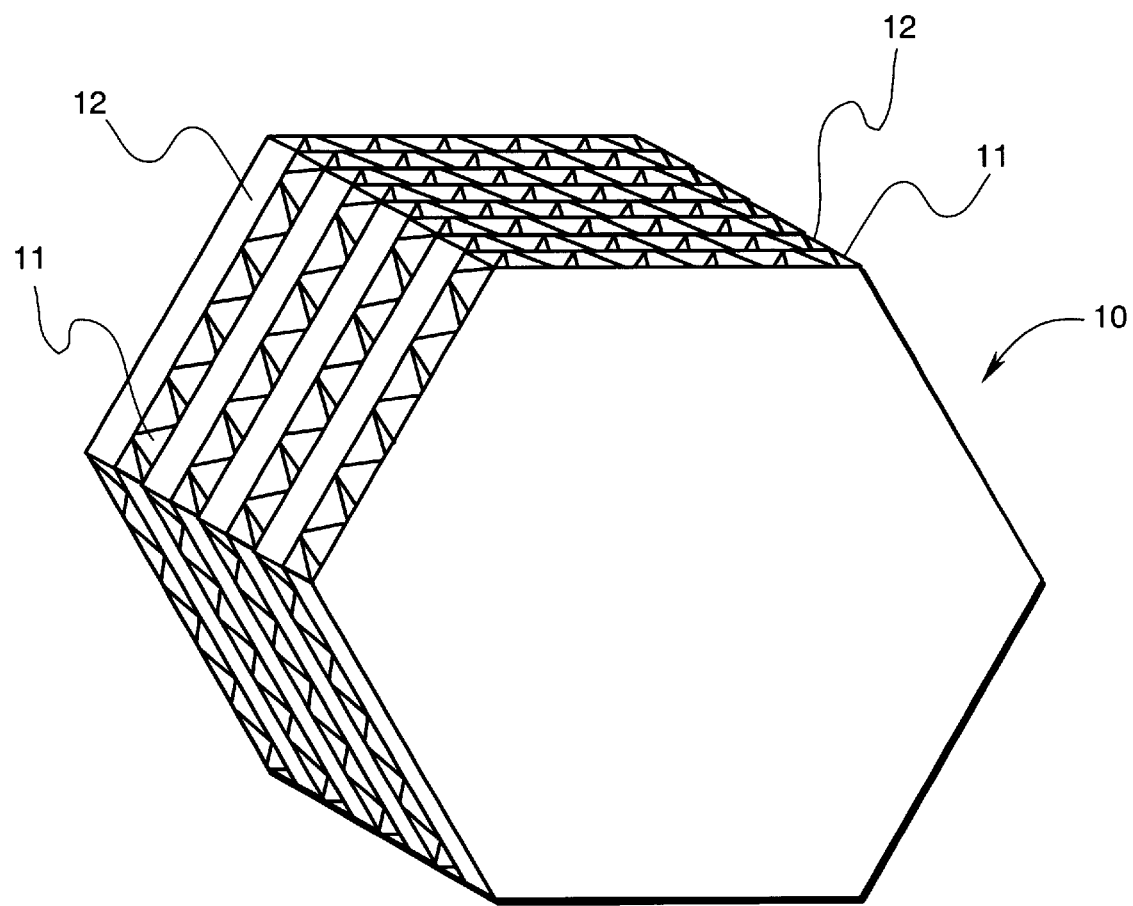
FIG. 4 is an isometric diagrammatic representation of the assembled heat exchanger according to a preferred embodiment of the present invention.

With reference to the isometric representation of FIG. 4, the assembled heat exchange 10 includes a plurality of adjacent stacked pairs of the plates 11 and 12, assembled such that the orientation of the plates is such that each of the plates 11 have the corrugated air flutes disposed at a 30° counter clockwise angle from vertical and each of the plates 12 having the corrugated air flutes disposed at a 30° clockwise angle from vertical. Plates 11 and 12 are preferably sealed to limit leakage between the separate air streams flowing through the flutes of the plates 11 and 12.

With further reference to FIGS. 5A and 5B, the plates 11 are preferably sealed along the lower left and upper right edges, and the plates 12 are preferably sealed along the lower right and upper left edges. A conventional plastic sealant is run parallel to the corrugated air flutes at those edges. The base and top edges of the plates 11 and 12 are not sealed. With reference to FIG. 4, note that in this assembled heat exchanger 10 the top and the base of the exchanger 10 have open air flutes of both plates 11 and 12. The upper left and lower right angled faces of the exchanger 10 have open air flutes from plate 11 only, while the upper right and lower left angled faces of the exchanger has open air flutes from plate 12 only. Accordingly, all six sides or faces of the assembled heat exchanger 10 have air flowing either in or out of the heat exchanger core.

FIG. 1 is an isometric representation of the air flows during the operation of the assembled heat exchanger 10. The heat exchanger 10 assembled as described above and illustrated in FIG. 4 separates air flows as they enter and leave the exchanger core. A primary air flow stream 21 enters the exchanger 10 on the lower right angled face on the exposed air flutes of plates 11, passes through the exchanger 10 along the parallel air flutes of the plates 11 and is discharged from the top face of the exchanger 10 as shown at 22, as either cooled air with no moisture added in the indirect only cooling mode, or as further cooled air with some moisture added in the two-stage cooling mode. Another primary air flow stream 25 enters the exchanger 10 on the lower left angled face on the exposed air flutes of the plates 12, passes through the exchanger 10 along the parallel air flutes of the plates 12 and is discharged from the top face of the exchanger, 10, as shown at 26, as either cooled air with no moisture added in the indirect only cooling mode, or as further cooled air with some moisture added in the two-stage cooling mode. A secondary air flow stream 23 enters the exchanger 10 on the upper left angled face on the exposed air flutes of the plates 11, passes through the exchanger 10 along the parallel air flutes of the plates 11 and is discharged from the base of the exchanger, 10, as process air 24 which is exhausted away from the system. The secondary air flow stream from 23 to 24 has water applied to the surfaces of the air flow flutes to promote evaporation so that this secondary air stream cools down the exchanger, 10. Another secondary air flow stream 27 enters the exchanger 10 on the upper right angled face on the exposed air flutes of the plates 12, passes through the exchanger 10 along the parallel air flutes of the plates 12 and is discharged from the base of the exchanger, 10, as process air 28 which is exhausted away from the system. The secondary air flow from 27 to 28 has water applied to the surfaces of the air flow flutes to promote evaporation so that this secondary sir stream cools down the exchanger, 10.

Figure 2A:
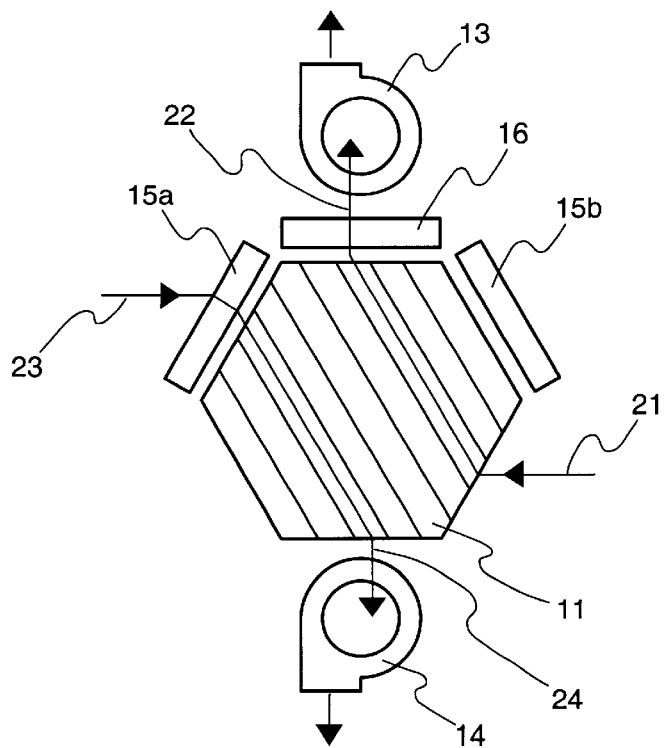
FIGS. 2A and 2B depict cross-sectional diagrammatic representations of the assembled heat exchanger of FIG. 1 illustrating the configuration of individual heat exchanger plates with respect to the air flow paths, and also including air blower locations.
Figure 2B:
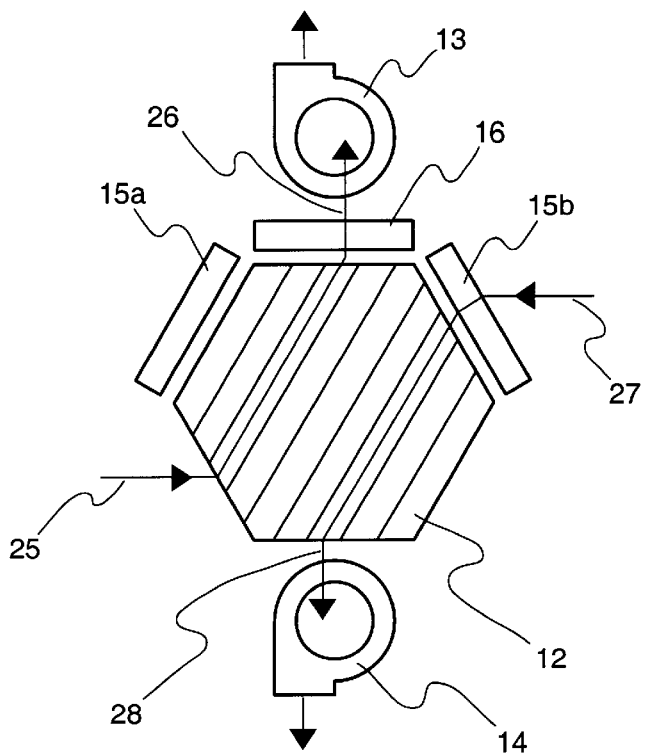

FIGS. 2A and 2B illustrate the air flow paths as a cross section of the assembled heat exchanger 10 as viewed along planes of the individual plates 11 and 12, respectively.

FIG. 2A illustrates a primary air stream 21 that enters the exchanger 10 on the lower right angled face and passes through the exchanger along the flutes of the plate 11 and is cooled indirectly (with the option of indirect plus direct if water is applied to the water distribution pad 16) and is discharged as supply air 22 by a fan blower 13. A secondary air stream 23 enters the exchanger 10 on the upper left face and passes through the exchanger 10 while evaporating water is applied to the exchanger from water distribution pad 15a and is discharged as exhaust air 24 by a fan blower 14.

As shown in FIG. 2B, a primary air stream 25 enters the exchanger 10 on the lower left face and passes through the exchanger 10 and is cooled indirectly (with the option of indirect plus direct cooling if water is applied to the water distribution pad 16) and is discharged as supply air 26 by a blower 13. A secondary air stream 27 enters the exchanger 10 on the upper right angled face and passes through the exchanger 10 while evaporating water is applied to the exchanger from water distribution pad 15b and is discharged as exhaust air 28 by a blower 14.

The supply air blower 13, pulls air from both primary air inlets 21 and 25, and the exhaust air blower 14, pulls air from both secondary air inlets 23 and 27.

Figure 3A:
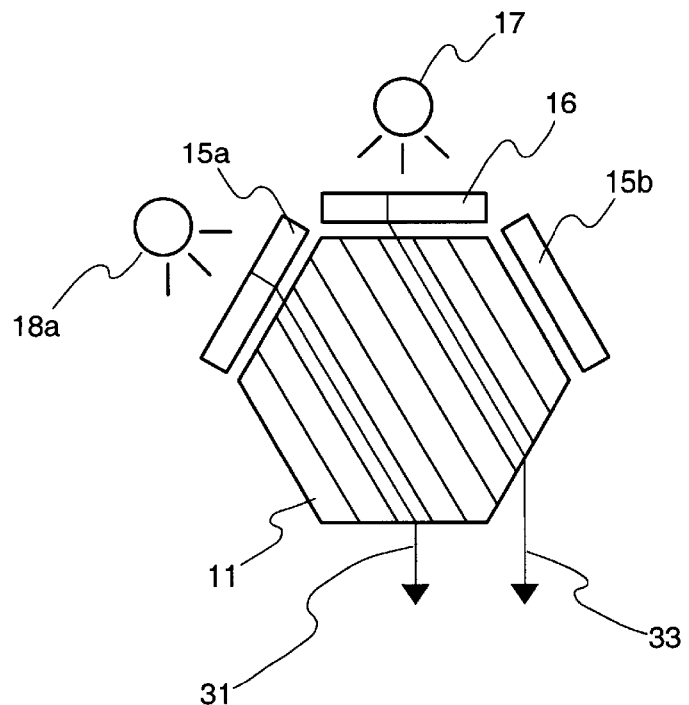
FIGS. 3A and 3B depict cross-sectional diagrammatic representations of the assembled heat exchanger of FIGS. 2A and 2B illustrating the configuration of the individual plates with respect to the water flow paths, and also illustrating the water distribution pads and nozzles.
Figure 3B:
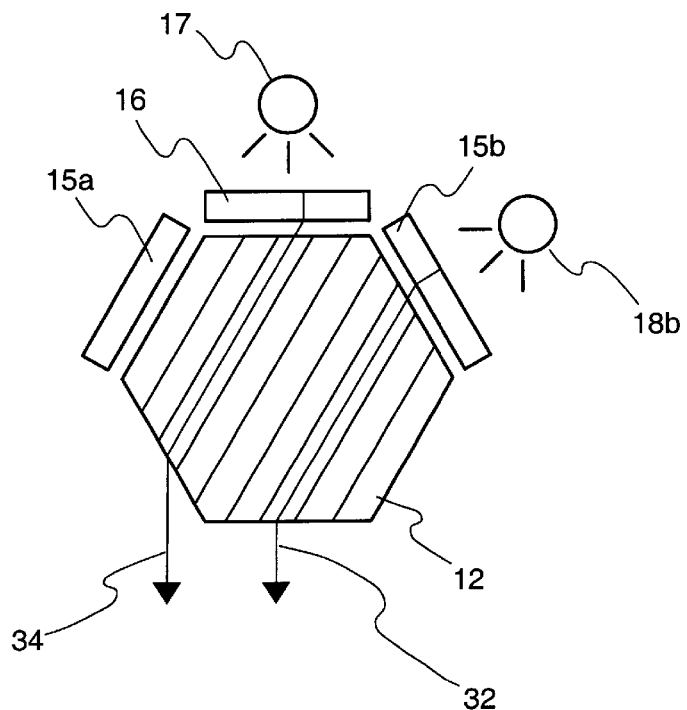

FIGS. 3A and 3B illustrate the water flow paths as a cross section of the assembled heat exchanger 10 as viewed along individual plates 11 and 12.

As shown in FIG. 3A, a secondary water flow nozzle 18a sprays the secondary water distribution pad 15a on the upper left angled face of the heat exchanger 10. This water 31, flows across the secondary side of the plate 11 and mixes with the secondary air flow 23 to 24. A primary water flow nozzle 17 sprays the primary water distribution pad 16 on the top face of heat exchanger 10. This water 33, flows across the primary side of the plate 11 and mixes with the primary air flow stream from 21 to 22. This primary water flow is only used when two-stage (indirect plus direct) evaporative cooling is desired.

FIG. 3B illustrates a secondary water flow nozzle 18b that sprays the secondary water distribution pad 15b on the upper right angled face of the heat exchanger 10. This water 32, flows across the secondary side of the plate 12 and mixes with the secondary air flow 27 to 28. A primary water flow nozzle 17 sprays the primary water distribution pad 16 on the top face of heat exchanger 10. This water 34, flows across the primary side of the plate 12 and mixes with the primary air flow stream from 25 to 26. This primary water flow is only used when two-stage (indirect plus direct) evaporative cooling is desired.

While the invention has been described and illustrated with reference to a single hexagonal core, it should be noted that a plurality of cores may be employed. Also, while a plastic material is currently preferred, metal or other materials may be employed for the construction of the heat exchanger and plates. While a sinusoidal construction of the air flow flutes has been illustrated, other constructions such as tubes with square, rectangular, circular, hexagonal, etc., cross-sectional shapes may be provided.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts or types of material within the principles of the invention to the full extent indicated by the broad general meaning of the terms in which the appended claims are expressed.

What is claimed is:

1. In an evaporative cooler operable in a combined direct and indirect cooling mode, the improvement comprising:
   a generally hexagonal heat exchanger formed by at least one pair of stacked adjacent plates, with a first plate of said pair having an air flow path disposed at an oblique angle to an air flow path of a second plate of said pair; and
   at least one air blower operative to direct air either into or out of all six faces of said heat exchanger.

2. The evaporative cooler of claim 1, further comprising a first water supply source operative to introduce water to a first air flow stream flowing through two of the six faces of said heat exchanger.

3. The evaporative cooler of claim 2, further comprising a second water supply source operative to introduce water to a second air flow stream flowing through two of the six faces of said heat exchanger.

4. The evaporative cooler of claim 3, further comprising a third water supply source operative to introduce water to a third air flow stream flowing through two of the six faces of said heat exchanger.

5. The evaporative cooler of claim 1, wherein said cooler is selectively operable in an indirect cooling mode by providing cooling water only to a secondary air flow stream, or in a combined direct and indirect cooling mode by providing cooling water to both primary and secondary air flow streams.

6. The evaporative cooler of claim 1, wherein said plates comprise a metal material.

7. The evaporative cooler of claim 1, wherein said plates comprise a plastic material.

8. The evaporative cooler of claim 1, wherein each of said plates comprise a generally hexagonal planar sheet secured to a sinusoidally curved sheet to provide a plurality of open-ended tubular air flow flutes.

9. An evaporative cooler, comprising:
   a generally hexagonal heat exchanger, said heat exchanger formed by a plurality of adjacent stacked plates, each pair of adjacent plates having obliquely angled air flow paths, with air flow paths of each pair of adjacent plates being substantially closed relative to one another; and
   at least one air blower operative to direct air either into or out of at least four faces of said heat exchanger, wherein said cooler is selectively operable in an indirect cooling mode by providing cooling water only to a secondary air flow stream, or in a combined direct and indirect cooling mode by providing cooling water to both primary and secondary air flow streams.

10. The evaporative cooler of claim 9, further comprising a first water supply source operative to introduce water to a first air flow stream flowing through two of the six faces of said heat exchanger.

11. The evaporative cooler of claim 10, further comprising a second water supply source operative to introduce water to a second air flow stream flowing through two of the six faces of said heat exchanger.

12. The evaporative cooler of claim 11, further comprising a third water supply source operative to introduce water to a third air flow stream flowing through two of the six faces of said heat exchanger.

13. The evaporative cooler of claim 9, wherein said plates comprise a metal material.

14. The evaporative cooler of claim 9, wherein said plates comprise a plastic material.

15. The evaporative cooler of claim 9, wherein each of said plates comprise a generally hexagonal planar sheet secured to a sinusoidally curved sheet to provide a plurality of open-ended tubular air flow flutes.

16. The evaporative cooler of claim 9, further comprising a water supply source including at least one nozzle.

17. The evaporative cooler of claim 9, further comprising a water supply source including at least one pad.

18. The evaporative cooler of claim 9, further comprising a water supply source including at least one nozzle operatively disposed to spray water on at least one pad.

19. An evaporative cooler employing combined direct and indirect evaporative cooling processes, comprising:
   a generally hexagonal heat exchanger;
   said heat exchanger including at least two first and second adjacent stacked hexagonal plates, each of said plates having a plurality of air flow flutes, with flutes on said first plate disposed at an oblique angular orientation relative to flutes on said second plate;
   water supply sources operatively disposed to direct water either into or out of all six sides of said hexagonal heat exchanger, said water supply sources operative to direct water (1) into an upper left angled face of said first plate and out a bottom face of said first plate, (2) into a top face of said first plate and out a lower right angled face of said first plate, (3) into an upper right angled face of said second plate and out a bottom face of said second plate, and (4) into a top face of said second plate and out a lower left angled face of said second plate; and
   at least one air blower operatively disposed to direct air either into or out of all six sides of said hexagonal heat exchanger.

20. An evaporative cooler employing combined direct and indirect evaporative cooling processes, comprising:
   a heat exchanger formed by a plurality of stacked plates, each plate being constructed substantially identically to an adjacent plate, each plate provided with a series of substantially parallel, open ended flutes through which air may pass, the flutes of one plate being angled at about sixty degrees with respect to the flutes of an adjacent plate;
   a first blower operative to direct a primary air flow stream in a first direction through the flutes of a first plate;
   a second blower operative to direct a secondary air flow stream in a second direction through the flutes of a second plate adjacent to said first plate;
   a first water source operative to introduce water to said primary air flow stream; and
   a second water source operative to introduce water to said secondary air flow stream.

21. The evaporative cooler of claim 20 wherein the periphery of each plate is substantially hexagonally shaped.

22. The evaporative cooler of claim 20 wherein said first blower is also operative to direct a primary air flow stream in a third direction through the flutes of said second plate and said second blower is also operative to direct a secondary air flow stream in a fourth direction through the flutes of said first plate.

23. The evaporative cooler of claim 20 wherein each of said water supply sources includes at least one pad.

* * * * *